(12) United States Patent
Jefford et al.

(10) Patent No.: US 9,506,428 B2
(45) Date of Patent: Nov. 29, 2016

(54) TURBO BYPASS SWITCH VALVE MOUNTING ON AIR BOX

(71) Applicant: Continental Automotive Systems, Inc., Auburn Hills, MI (US)

(72) Inventors: Robert Douglas Jefford, Chatham (CA); Benjamin Dominick Manton Williams, Chatham (CA); David William Balsdon, Chatham (CA); David Rene Forgeron, Chatham (CA); Adrian Ovidiu Crisan, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 252 days.

(21) Appl. No.: 14/282,512

(22) Filed: May 20, 2014

(65) Prior Publication Data

US 2014/0345573 A1 Nov. 27, 2014

Related U.S. Application Data

(60) Provisional application No. 61/825,649, filed on May 21, 2013, provisional application No. 61/825,681, filed on May 21, 2013, provisional application No. 61/825,616, filed on May 21, 2013.

(51) Int. Cl.

| | |
|---|---|
| *F02M 33/02* | (2006.01) |
| *F02M 25/08* | (2006.01) |
| *F16K 27/00* | (2006.01) |
| *F16K 15/14* | (2006.01) |
| *F16K 31/06* | (2006.01) |
| *B60K 15/035* | (2006.01) |

(52) U.S. Cl.
CPC ..... *F02M 25/0836* (2013.01); *F02M 25/0818* (2013.01); *F16K 15/148* (2013.01); *F16K 27/00* (2013.01); *F16K 31/0658* (2013.01); *B60K 15/03504* (2013.01); *Y10T 137/5109* (2015.04); *Y10T 137/6851* (2015.04); *Y10T 137/86485* (2015.04)

(58) Field of Classification Search
CPC ........... F02M 25/0854; F02M 25/089; F02M 25/08; B60K 15/03504
USPC ........................................................ 123/519
See application file for complete search history.

(56) References Cited

U.S. PATENT DOCUMENTS

| | | | | |
|---|---|---|---|---|
| 6,119,661 A | * | 9/2000 | DeLand | F02M 25/0836 123/458 |
| 6,446,618 B1 | * | 9/2002 | Hill | F02M 25/089 123/519 |
| 2009/0101119 A1 | * | 4/2009 | Ammermann | F02M 25/0854 123/519 |
| 2012/0318243 A1 | * | 12/2012 | Williams | F02M 25/0836 123/520 |

* cited by examiner

*Primary Examiner* — Lindsay Low
*Assistant Examiner* — Charles Brauch

(57) ABSTRACT

A system which includes a turbo bypass switching valve (BSV) positioned at a beneficial location as a direct mount on an air box to achieve compliance to OBD hose-off requirement via electronic actuation of the BSV and monitoring of the fuel tank pressure sensor for pressure change. When the turbocharger unit is generating pressurized air, the turbo BSV is open, and vapor is passing through the purge valve, some level of vacuum in the fuel tank is sensed. By closing the BSV, flow through the venturi is reduced, producing both less vacuum and a change in fuel tank pressure. The pressure change does not occur if any of the hoses become disconnected. This results in a simple OBD "venture hose off" check without additional components.

16 Claims, 4 Drawing Sheets

TURBO BYPASS SWITCH VALVE MOUNTING ON AIR BOX

CROSS-REFERENCE TO RELATED APPLICATIONS

This application claims the benefit of U.S. Provisional Application No. 61/825,649 filed May 21, 2013, U.S. Provisional Application No. 61/825,681 filed May 21, 2013, and U.S. Provisional Application No. 61/825,616 filed May 21, 2013. The disclosures of the above applications are incorporated herein by reference.

FIELD OF THE INVENTION

The invention relates generally to a valve assembly which is mounted on an air box and capable of providing venting from a carbon canister, as well as providing venting from the fuel EVAP system during OBD testing.

BACKGROUND OF THE INVENTION

Current turbo purge systems use a venturi vacuum generator (such as a vacuum pump) to allow purge of the evaporative system while the turbocharger unit is activated (i.e., the intake manifold is under positive pressure). This vacuum pump often uses significant amounts of the pressurized air created by the turbocharger unit, thereby reducing the power increase created by the turbocharger unit. In order to limit the amount of turbo air running through the pump, and temporarily maximize engine power, a turbo bypass switching valve (BSV) has been used to alter the amount of flow going to the vacuum pump (venturi nozzle).

Recent changes in the legislation of evaporative emissions management systems have required that the On-Board Diagnostic (OBD) system have the capacity to determine if the outlet flow of the venturi (which contains hydrocarbons) is connected to the vehicle inlet system, or if it has become disconnected or broken.

To provide compliance with these regulations, various systems typically require a separate (OBD) relief valve to conduct the OBD test, and detect if there is a leak, or if one or more of the hoses has become disconnected. The valve is necessary to conduct the OBD test. However, the inclusion of this valve adds complexity and cost to the system.

Other attempts to comply with the regulations include systems with the turbo BSV mounted in-line and upstream of the vacuum pump. The drawback to this approach is that this results in an increase in the temperature and pressure requirements for the turbo BSV. Also, the OBD check for every hose connection is more complex and may require additional components.

Accordingly, there exists a need for a valve assembly which is incorporated into the airflow system which is capable of performing the OBD test for failure, as well as having the capability to perform purge system function.

SUMMARY OF THE INVENTION

The present invention provides a system which includes a turbo bypass switching valve (BSV) positioned at a beneficial location as a direct mount on the air box. In this configuration, the system achieves compliance to OBD hose-off requirement via electronic actuation of the BSV and monitoring of the carbon canister pressure sensor for reaction, such as pressure change. This configuration has cost and efficiency benefit over other systems.

In one embodiment, the turbo BSV is mounted on or within the air box and secured with a fastener, such as a bolt. The venturi vacuum generator (vacuum pump) is installed in-line between the turbocharger unit and turbo BSV.

Having the BSV mounted on the air box reduces the number of connections, and the temperature and pressure requirements for the BSV are significantly reduced, resulting in cost benefits.

A secure connection using a bolt between turbo BSV and air box allows the OBD system to detect any hose disconnection between any one of the outlet of the turbocharger unit, the venturi vacuum generator, and the turbocharger unit. At a steady state, when the turbocharger unit is generating pressurized air, the turbo BSV is open, and vapor is passing through the purge valve, some level of vacuum in the carbon canister is sensed. By closing the BSV, flow through the venturi is reduced, producing both less vacuum and a change in canister pressure. This pressure change is detected by a pressure sensor, and any change in the state of operation of the BSV results in a change in the state of the pressure sensor. The pressure change does not occur if any of the hoses mentioned above is disconnected, of there is a leak. This results in a simple OBD "venturi hose off" check without additional components.

One of the advantages of the configuration of the present invention is the reduced temperature and pressure requirements for the turbo BSV because of the mounting of the BSV on the air box, and simplified OBD check for every hose connection by securing the turbo BSV on the air box.

In one embodiment, the present invention is a bypass switching valve assembly mounted on an air box, where the valve assembly includes an overmold assembly having an inlet port, a bypass switching valve, and an overmold assembly cavity formed as part of the overmold assembly, where the bypass switching valve located in the overmold assembly near the overmold assembly cavity. A cap is connected to the overmold assembly, a reservoir is connected to the cap, and a reservoir cavity is formed as part of the reservoir. A cap aperture is formed as part of the cap, such that the cap aperture provides fluid communication between the overmold assembly cavity and the reservoir cavity when the bypass switching valve is in an open position.

A bleed aperture is formed as part of the cap, and the bleed aperture provides fluid communication between the overmold assembly cavity and the reservoir cavity when the bypass switching valve is in the open position or in a closed position such that pressurized air and purge vapor are able to pass from the overmold assembly cavity to the reservoir cavity under low-pressure conditions.

At least one port is connected to the reservoir and is in fluid communication with the reservoir cavity. The port extends into an aperture formed as part of an air box. A check valve is connected to the reservoir, the check valve is biased towards a closed position such that when pressurized air and purge vapor flow into the inlet port and the overmold assembly cavity, and the bypass switching valve is in the open position, the pressurized air and purge vapor flow through the cap aperture, through the reservoir cavity, and force the check valve into an open position, such that the pressurized air and purge vapor flow through the port and into the air box.

The valve assembly and the air box are part of an air flow system which includes a carbon canister containing the purge vapor, where the carbon canister is in fluid communication with the valve assembly, and a pressure sensor is connected to the carbon canister. The pressure sensor detects changes in pressure in the carbon canister, such that a diagnostic check is performed when the bypass switching valve is switched between an open position and a closed position. During normal operation when the air flow system is functioning properly, the pressure in the canister changes when the bypass switching valve changes between an open position and a closed position. When a change in pressure in the canister is not detected by the pressure sensor as the bypass switching valve changes between an open position and a closed position, an indication is provided that the air flow system is functioning improperly.

In alternate embodiments, various turbo BSV and various venturi vacuum generators (vacuum pumps) are used in the same configuration and all are suitable with the same effect.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
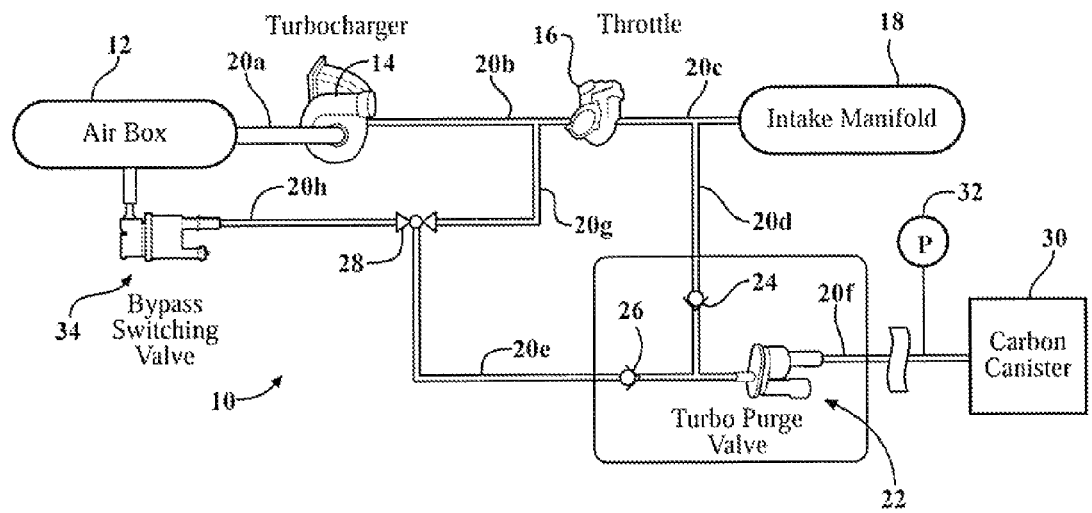
FIG. 1 is a diagram of an airflow system for a vehicle having a turbo bypass switching valve assembly mounted on an air box, according to embodiments of the present invention.
Figure 2:
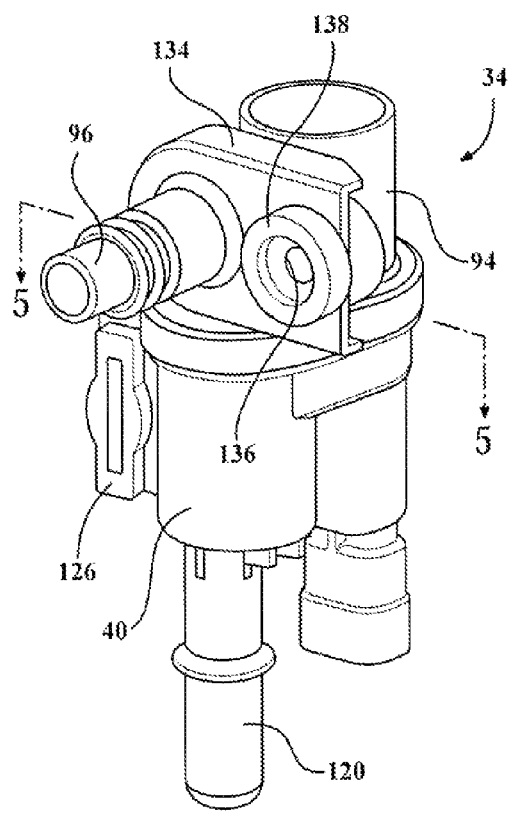
FIG. 2 is a perspective view of a turbo bypass switching valve assembly, according to embodiments of the present invention.

A diagram of an air flow system having a bypass switching valve (BSV) mounted to an air box according to the present invention is shown in the FIG. 1 generally at 10. The system 10 includes an air box 12 which intakes air from the atmosphere, and the air box 12 is connected to a first conduit 20a. There are several conduits which provide fluid communication between the various components. Located downstream of and in fluid communication with the first conduit 20a is a turbocharger unit 14, and located downstream of and in fluid communication with the turbocharger unit 14 is a throttle assembly 16. The throttle assembly 16 controls the amount of air flow into an intake manifold 18, which is part of an engine. Air flows from the throttle assembly 18 into the intake manifold 20.

As mentioned above, a plurality of conduits also provides fluid communication between the various components. Air flows through the conduits between the various components, and the direction of airflow through the conduits varies, depending on the mode of operation of each component. More specifically, in addition to the first conduit 20a providing fluid communication between the air box 12 and the turbocharger unit 14, there is a second conduit 20b providing fluid communication between the turbocharger unit 14 and the throttle assembly 16. There is also a third conduit 20c providing fluid communication between the throttle assembly 16 and the intake manifold 18.

A fourth conduit 20d is in fluid communication with the third conduit 20c and a fifth conduit 20e. The fifth conduit 20e also places a turbo purge valve assembly, shown generally at 22, in fluid communication with a venturi valve assembly 28. A first check valve 24 is located in the fourth conduit 20d, and a second check valve 26 is located in the fifth conduit 20e. There is also a carbon canister 30 in fluid communication with the turbo purge valve assembly 22 through the use of a sixth conduit 20f, and a pressure sensor 32 connected to the carbon canister 30 to detect the pressure in the carbon canister 30.

A seventh conduit 20g provides fluid communication between the venturi valve assembly 28 and the second conduit 20b, such that pressurized air is able to flow from the second conduit 20b, through the seventh conduit 20g and to the venturi valve assembly 28. An eighth conduit 20h provides fluid communication between the venturi valve assembly 28 and a bypass switching valve assembly, shown generally at 34.

With reference to FIGS. 2-5, connected to the air box 12 and the eighth conduit 20h is the bypass switching valve assembly 34. The bypass switching valve assembly 34 includes a third check valve, or bypass check valve, shown generally at 36, and a bypass switching valve, shown generally at 38.

The bypass switching valve assembly 34 also includes an overmold assembly 40, and disposed within the overmold assembly 40 is a solenoid assembly, shown generally at 42, which is part of the bypass switching valve 38. The solenoid assembly 42 is disposed within a cavity, shown generally at 44, formed as part of the overmold assembly 40, and the cavity 44 includes an inner wall portion 46. Also forming part of the cavity 44 is an outer wall portion 48 of the overmold assembly 40.

The solenoid assembly 42 includes a stator insert 50 which surrounds a support 52 formed as part of the overmold assembly 40. A first washer 54 is disposed between an upper wall 56 of the overmold assembly 40 and a bobbin 58. The bobbin 58 is surrounded by a coil 60, and two straps (not shown) surround the coil 60. There is a sleeve 62 which is surrounded by the bobbin 58, and the sleeve 62 partially surrounds a moveable armature 64. The armature 64 includes a cavity, shown generally at 68, and located in the cavity 68 is a spring 70, which is in contact with an inner surface 72 of the cavity 68. The spring 70 is also mounted on a narrow diameter portion 74 of the support 52. Disposed between part of the armature 64 and the bobbin 58 is a second washer 76. Connected to the overmold assembly 40 is a cap 78, and formed as part of the cap 78 is a valve seat 80 and a cap aperture 82, where purge vapor is able to flow from an overmold assembly cavity, shown generally at 108, formed as part of the overmold assembly 40 and through the cap aperture 82.

The armature 64 includes a stopper portion 64a which is made of a rubber or other flexible material. The stopper portion 64a includes a contact surface 84 which contacts the valve seat 80 when the armature 64 is in the closed position.

Figure 3:
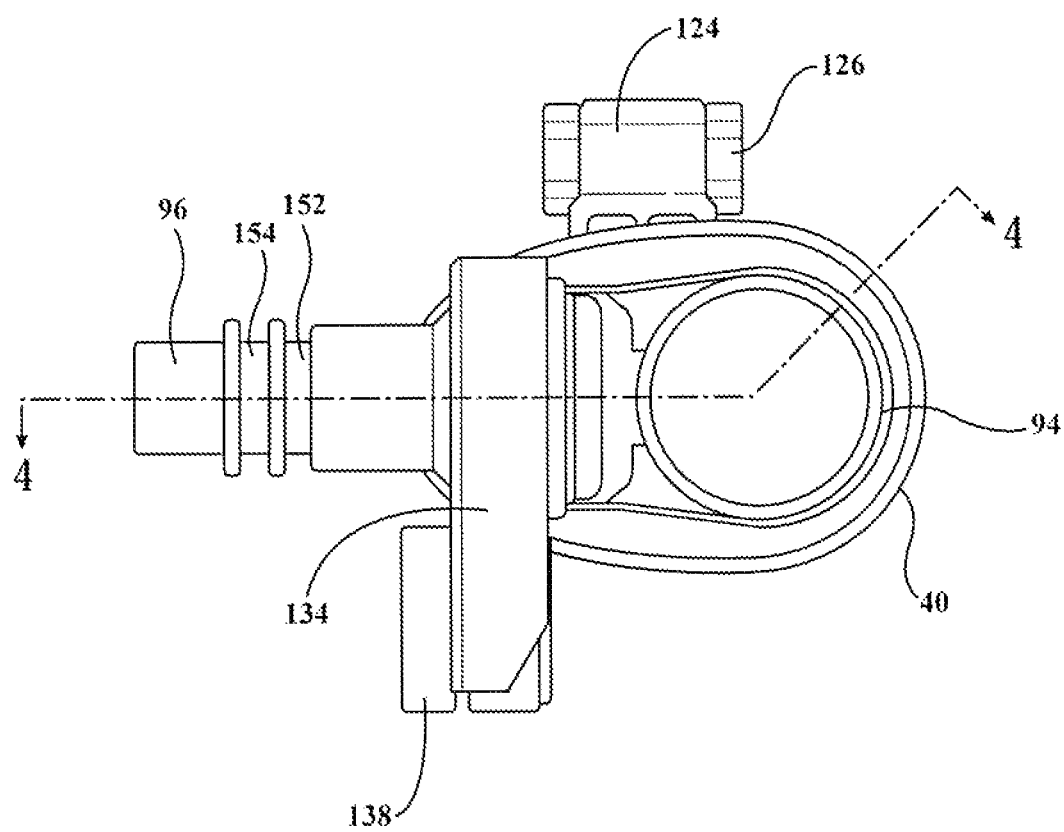
FIG. 3 is a top view of a turbo bypass switching valve assembly, according to embodiments of the present invention.
Figure 4:
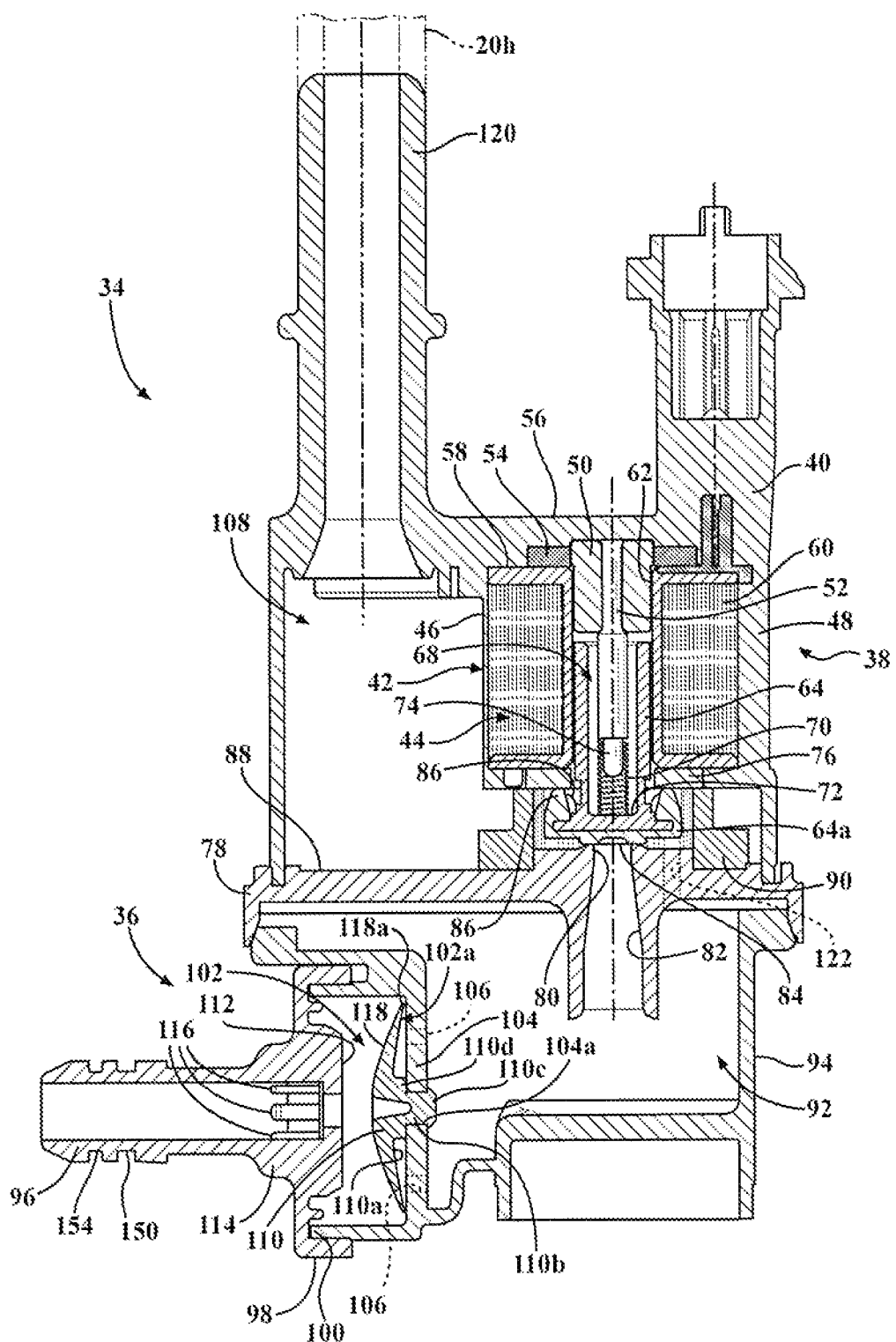
FIG. 4 is a sectional side view taken along lines 4-4 of FIG. 3, according to embodiments of the present invention.
Figure 5:
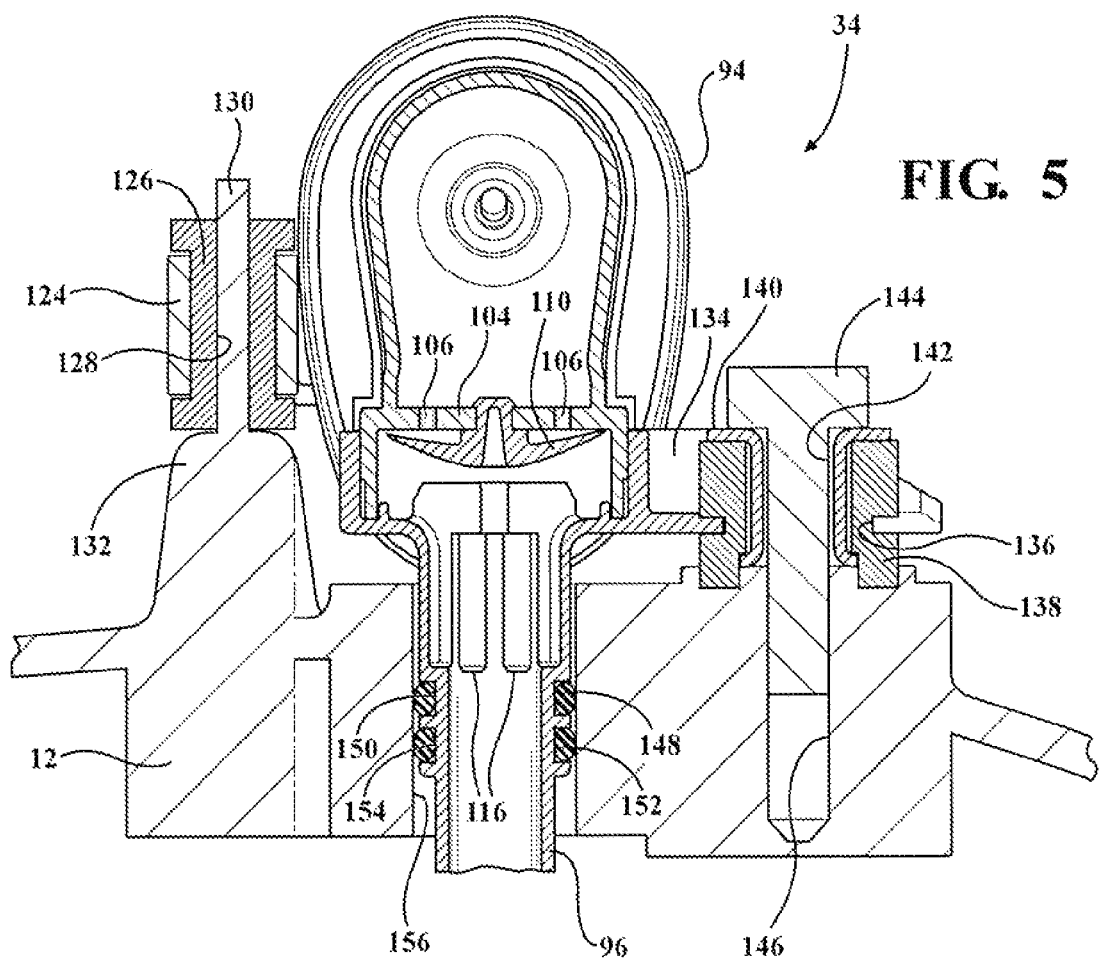
FIG. 5 is a sectional top view taken along lines 5-5 of FIG. 2, with the turbo bypass switching valve assembly mounted to an air box, according to embodiments of the present invention.

The stopper portion 64a includes a plurality of post members 86 which are of the same durometer, but are of different sizes, and therefore have different levels of stiffness. The largest post members 86 are in contact with the bottom surface of the washer 76 when the armature 64 is in the closed position, as shown in FIG. 3. The smaller post members 86 contact the bottom surface of the washer 76 when the armature 64 moves to the open position. The more the coil 60 is energized, the further the armature 64 moves away from the valve seat 80, and the greater number of post members 86 contact the bottom surface of the washer 76. Because the post members 86 are made of rubber, the post members 86 are able to deform as the armature 64 is moved further away from the valve seat 80. The largest post members 86 in contact with the bottom surface of the washer 76 deform first when the armature 64 moves away from the valve seat 80. As the armature 64 moves further away from the valve seat 80, more of the post members 86 contact the bottom surface of the washer 76, and then begin to deform as the armature 64 moves even further away from the valve seat 80. The deformation of the post members 86 (when the armature 64 is moved to the open position away from the valve seat 80) functions to dampen the movement of the armature 64, eliminating noise, and preventing metal-to-metal contact between the armature 64 and the stator insert 50.

Disposed between the bottom surface of the washer 76 and an inside surface 88 of the cap 78 is a filter 90. The filter 90 is made of several blades of plastic which are adjacent one another. The filter 90 is designed to limit the size of debris and particles passing through the blades of plastic to less than 0.7 millimeters. The distance between the armature 64 and the stator insert 50 is about 1.0 millimeters, and is the maximum allowable distance between the contact surface 84 of the stopper portion 64a and the valve seat 80, when the armature 64 is moved to the fully open position. The filter 90 ensures that no particles may pass through the filter 90 that are too large to affect the functionality of the solenoid assembly 42 (the particles being too large to fit between the valve seat 80 and the stopper portion 64a) when the armature 64 is in the open position.

The aperture 82 is also in fluid communication with a reservoir cavity, shown generally at 92, formed as part of a reservoir 94. The cavity 92 is also in fluid communication with the check valve 36. The check valve 36 includes a vent port 96, and the vent port 96 includes a cap portion 98 which is connected to a flange portion 100 formed as part of the reservoir 94. The connection between the cap portion 98 and the flange portion 100 may be any suitable connection, such as snap-fitting, welding, an adhesive, or the like. The connection between the cap portion 98 and the flange portion 100 forms a first check valve cavity, shown generally at 102, and formed as part of a lower wall 104 of the reservoir 94 is a plurality of check valve apertures 106, which allow for fluid communication between the cavity 102 and the cavity 92 when the check valve 36 is in an open position.

The check valve 36 also includes a valve member 110, which in this embodiment is an umbrella valve member 110, located in the check valve cavity 102, and includes a flexible flange portion 118 that selectively contacts the lower wall 104. The valve member 110 also includes an inside surface 110a which is part of the flange portion 118, and a base member 110b which is at least partially disposed in a central aperture 104a which is formed as part of the lower wall 104. Formed as part of the base member 110b is a retention feature 110c, which has a larger diameter than the central aperture 104a. The valve member 110 is made of a flexible material, such as rubber, and during assembly, the base member 110b is pressed through the central aperture 104a such that the retention feature 110c is moved into the reservoir cavity 92, as shown in FIG. 3. Because the diameter of the retention feature 110c is larger than the diameter of the central aperture 104a, the base member 110b is prevented from being removed from the central aperture 104a. The central aperture 104a surrounds part of the base member 110b, and part of the lower wall 104 is disposed between the retention feature 110c and a support member 110d, which is also formed as part of the base member 110b, securing the valve member 110 in place relative to the lower wall 104. As mentioned above, the valve member 110 is made of a flexible material, and the flange portion 118 deflects when exposed to air flow in different directions.

An inner wall 112 is part of a base portion 114, and also formed as part of the base portion 114 is a plurality of vents 116 which are in fluid communication with the cavity 102, such that when the flange portion 118 is not in contact with the side wall 104, purge vapor is able to flow from the cavity 92 through the apertures 106 into the cavity 102, and through the vents 116 and into the first vent port 96.

A bleed aperture 122 is formed as part of the cap 78, and is substantially parallel to the cap aperture 82, and places the overmold assembly cavity 108 in continuous fluid communication with the reservoir cavity 92. The bleed aperture 122 is also located in proximity to the cap aperture 82 such that any air or purge vapor passing through the aperture 122 must also pass through the filter 90 before passing through the bleed aperture 122 and into the reservoir cavity 92. The bleed aperture 122 is substantially smaller in diameter in comparison to the cap aperture 82, and only allows for a small amount of air and purge vapor to pass through.

As mentioned above, the BSV assembly 34 is mounted on the air box 12. In this embodiment, the BSV assembly 34 is mounted to the air box 12 using a mounting assembly having a plurality of brackets. Formed as part of the overmold assembly 40 is a first bracket 124 which is part of the mounting assembly. Mounted to the first bracket 124 is a first isolator 126 having a slot 128, and located in the slot 128 is a flange 130, which is formed as part of the air box 12. The slot 128 is substantially rectangular shaped, and the flange 130 is shaped to correspond to the shape of the slot 128, such that the flange 130 fits within the slot 128.

The flange 130 protrudes away from a base portion 132 formed as part of the air box 12. Part of the first isolator 126 contacts the base portion 132 when the flange 130 is located in the slot 128.

Also part of the mounting assembly is a second bracket 134 which is connected to the reservoir 94. The second bracket 134 includes an aperture 136, and disposed in the aperture 136 is a second isolator 138 and a washer 140. The washer 140 includes an aperture 142, and selectively disposed within the aperture 142 is a fastener, which in this embodiment is a bolt 144. When assembled, the bolt 144 at least partially extends into an aperture 146 formed as part of the air box 12.

The second bracket 134 is formed as part of the cap portion 98 of the vent port 96, and the vent port 96 is surrounded by a sealing device. In this embodiment, the sealing device is a first O-ring 148 disposed in a first groove 150, and a second O-ring 152 disposed in a second groove 154. The vent port 96 extends into a flow aperture 156 formed as part of the air box 12, and a seal between the vent port 96 and the flow aperture 156 is provided by the O-rings 148,152. More specifically, the first O-ring 148 is disposed in the first groove 150 and is in contact with the inner surface of the aperture 156, and the second O-ring 152 is disposed in the second groove 154 and is also in contact with the inner surface of the aperture 156. However, it is within the scope of the invention that other types of seals may be used, other than the O-rings 148,152.

During the assembly of the CPV 10 to the air box 12, the flange 130 is inserted into the slot 128. The placement of the flange 130 into the slot 128 ensures that the aperture 142 of the washer 140 is properly aligned with the aperture 146 of the air box 12, and provides alignment between the vent port 96 and the flow aperture 156. After the flange 130 is inserted into the slot 128 and the vent port 96 is positioned in the flow aperture 156, the bolt 144 is inserted through the aperture 142 of the washer 140 and into the aperture 146. The aperture 146 and the bolt 144 are threaded such that the bolt 144 may be tightened. This provides a rigid connection between the bypass switching valve assembly 34 and the air box 12.

The first bracket 124 does not contact the air box 12 because of the first isolator 126, the second bracket 134 does not contact the air box 12 because of the second isolator 138 and the washer 140, and the vent port 96 does not contact the air box 12 because of the O-rings 148,152. Therefore, the bypass switching valve assembly 34 is not in contact with the air box 12, but is still rigidly connected to the air box 12 because of the bolt 144 and the washer 140. This prevents the bypass switching valve assembly 34 from contacting the air box 12, and therefore prevents any noise generation resulting from vibration in the air box 12, and also provides noise isolation to the air box 12.

Referring again to the Figures generally, the air flow system 10 has multiple modes of operation. In a first mode of operation, when the turbocharger unit 14 is not active, there is vacuum pressure in the intake manifold 18 created by the engine during the first mode of operation, wherein air flows from the air box 12 through the first conduit 20a, the turbocharger unit 14, the throttle 16, and into the intake manifold 18. This vacuum pressure is also in the fourth conduit 20d, and when the turbo purge valve assembly 22 is in an open position, the vacuum pressure causes the first check valve 24 to open, where during the first mode of operation, the vacuum pressure draws the purge vapor from canister 30, through the sixth conduit 20f, the turbo purge valve assembly 22, and into part of the fifth conduit 20e prior to entering into the fourth conduit 20d. The purge vapor then flows through the fourth conduit 20d, through the third conduit 20c where the purge vapor mixes with air and flows into the intake manifold 18. During the first mode of operation, the bypass switching valve assembly 34 is not exposed to the vacuum pressure from the intake manifold 18, but rather is exposed to atmospheric pressure in the air box 12. Since the check valve 36 is biased towards a closed position, the check valve 36 remains closed during the first mode of operation.

The air flow system 10 also has a second mode of operation, where the turbocharger unit 14 is activated, and air flowing into the turbocharger unit 14 from the first conduit 20a becomes pressurized, the pressurized air then flows through the second conduit 20b and into the throttle 16, and the air then flows through the third conduit 20c and into the intake manifold 18. In this second mode of operation, the manifold 18 is operating under positive pressure. Some of this pressurized air flows into the fourth conduit 20d, and places the first check valve 24 in a closed position.

The pressurized air passing through the seventh conduit 20g also passes through the venturi valve assembly 28, and into the eighth conduit 20h. The pressurized air flowing through the venturi valve assembly 28 also creates vacuum pressure in the fifth conduit 20e, where air is drawn from the fifth conduit 20e into venturi valve assembly 28, such that the air passes through the eighth conduit 20h and into the BSV assembly 34. During the second mode of operation, this vacuum pressure in the fifth conduit 20e also places the second check valve 26 in an open position. During the second mode of operation, purge vapor from the canister 30 passes through the sixth conduit 20f, the turbo purge valve assembly 22 (when the turbo purge valve assembly 22 is in the open position), and into the fifth conduit 20e. The purge vapor flows into the venturi valve assembly 28 and mixes with the pressurized air in the eighth conduit 20h, and flows into bypass switching valve assembly 34.

When the pressurized air flows into the bypass switching valve assembly 34, the pressurized air also flows into the cavity 108 of the overmold assembly 40 from an inlet port 120 connected to the eighth conduit 20h. When the solenoid assembly 42 moves the armature 64 away from the valve seat 80, placing the bypass switching valve 38 in an open position, the pressurized air then flows through the aperture 82, the cavity 92 of the reservoir 94, through the apertures 106, and into the valve cavity 102. When the third check valve 36 is in the closed position, there is an enclosed area, shown generally at 102a, formed by the shape of the flange portion 118 being in contact with the bottom surface of the lower wall 104. More specifically, an outer edge 118a of the flange portion 118 contacts the bottom surface of the lower wall 104, and the area between the flange portion 118 and the bottom surface of the lower wall 104 forms the enclosed area 102a. Once the air flows through the apertures 106, the pressurized air then applies pressure to the inside surface 110a of the valve member 110 in the enclosed area 102a, causing the flange portion 118 to deflect. The outer edge 118a of the flange portion 118 moves away from the lower wall 104, and the check valve 36, and more particularly the valve member 100, is in the open position. Once the air has passed into the valve cavity 102 when the valve member 100 is in the open position, the pressurized air then flows through the vents 116, the vent port 96, and into the air box 12.

One the air and purge vapor mixture has passed through the bypass switching valve assembly 34, the air and purge vapor mixture then flows into the air box 12. The purge vapor and air mixture then flows through the turbocharger unit 14, the throttle 16, and into the intake manifold 18.

As mentioned above, the bleed aperture 122 functions to provide continuous fluid communication between the overmold assembly cavity 108 and the reservoir cavity 92, even when the bypass switching valve 38 is in the closed position, to ensure that when the turbocharger unit 14 is generating pressurized air, and that there is still flow through the bypass switching valve assembly 34 at levels of low air flow. The turbocharger unit 14 is able to generate different levels of pressurized air, and therefore to ensure that there is vacuum pressure in the fifth conduit 20e, the pressurized air passes through the venturi valve assembly 28, and if there is no flow allowed through the bypass switching valve assembly 34, there is no flow in the eighth conduit 20h. The flow through the venturi valve assembly 28 may therefore be limited, reducing the amount of vacuum pressure generated by the venturi valve assembly 28 in the fifth conduit 20e.

In the embodiments described above, the third check valve 36 is an umbrella valve. However, it is within the scope of the invention that the third check valve 36 may be other types of valves, such as a ball valve, a flap, a duckbill, or the like, and all would be suitable.

The bypass switching valve assembly 34 may also be used to run a diagnostic check on the system 10 using the pressure sensor 32. For example, when the system 10 is operating in the second mode of operation, and the turbocharger unit 14 is generating pressurized air, there is vacuum pressure in fifth conduit 20e as mentioned above, and therefore in order to draw the purge vapor from the canister 30 to the BSV assembly 34, the vacuum pressure is also in the sixth conduit 20f when the turbo purge valve assembly 22 is in the open position, and the carbon canister 30. This vacuum pressure is detectable by the pressure sensor 32. If the bypass switching valve 38 of the BSV assembly 34 is changed between open and closed positions during the second mode of operation, there should be a change in vacuum pressure which is detectable by the pressure sensor 32. If there is no change in pressure as detected by the pressure sensor 32, then there is a leak somewhere in the system, such as a leak or a disconnection of one of the conduits 20e, 20f, or 20h. One of the advantages of the present invention is that since the BSV assembly 34 is mounted directly on the air box 12, a conduit or hose is eliminated, and therefore not needed to provide a connection and fluid communication between the BSV assembly 34 and the air box 12. Air and purge vapor in the BSV assembly 34 flows directly from the vent port 96, into the flow aperture 156, and into the air box 12. Therefore, if there is a leak, or a "hose off" condition, where one of the conduits becomes disconnected, any concern of a leak between the BSV assembly 34 and the air box 12 is reduced or eliminated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a valve assembly, including:
   a first cavity;
   a second cavity;
   a bypass switching valve fluidly connecting the first cavity and the second cavity;
   at least one port connected to and in fluid communication with the second cavity, the at least one port connected to and extending into an air box; and
   a check valve fluidly connecting the second cavity and the at least one port;
   wherein pressurized air and purge vapor selectively flow into the first cavity such that when the bypass switching valve is in the open position, the pressurized air and purge vapor flow from the first cavity to the second cavity, and force the check valve into an open position, such that the pressurized air and purge vapor flow from the second cavity, through the at least one port, and into the air box.

2. The apparatus of claim 1, the first cavity further comprising an overmold assembly cavity formed as part of an overmold assembly.

3. The apparatus of claim 1, the second cavity further comprising a reservoir cavity formed as part of a reservoir.

4. The apparatus of claim 1, further comprising a cap having a cap aperture, wherein the cap aperture is adjacent the bypass switching valve, and provides fluid communication between the first cavity and the second cavity when the bypass switching valve is in the open position.

5. The apparatus of claim 1, further comprising a bleed aperture, wherein the bleed aperture provides fluid communication between the first cavity and the second cavity when the bypass switching valve is in the open position or in a closed position, such that pressurized air and purge vapor are able to pass from the first cavity to the second cavity under low-pressure conditions.

6. The apparatus of claim 1, wherein the valve assembly and the air box are part of an air flow system.

7. The apparatus of claim 6, the air flow system further comprising:
   a carbon canister containing the purge vapor, the carbon canister in fluid communication with the valve assembly; and
   a pressure sensor connected to the carbon canister such that the pressure sensor detects changes in pressure in the carbon canister;
   wherein a diagnostic check is performed when the bypass switching valve is switched between an open position and a closed position, such that the pressure in the canister changes when the bypass switching valve changes between an open position and a closed position, and when a change in pressure in the canister is not detected by the pressure sensor as the bypass switching valve changes between an open position and a closed position, an indication is provided that the air flow system is functioning improperly.

8. A valve assembly, comprising:
   an overmold assembly;
   an overmold assembly cavity formed as part of the overmold assembly;
   a reservoir;
   a reservoir cavity formed as part of the reservoir;
   a bypass switching valve located in the overmold assembly adjacent the overmold assembly cavity, the bypass switching valve fluidly connecting the overmold assembly cavity and the reservoir cavity such that the bypass switching valve controls an amount of pressurized air and purge vapor which flows from the overmold assembly cavity to the reservoir cavity;
   at least one port connected to and in fluid communication with the reservoir cavity, the at least one port connected to and extending into an air box; and
   a check valve fluidly connecting the reservoir cavity and the at least one port, such that the check valve controls the amount of pressurized air and purge vapor between the reservoir cavity and the at least one port;
   wherein pressurized air and purge vapor selectively flow into the overmold assembly cavity such that when the bypass switching valve is in the open position, the pressurized air and purge vapor flow from the overmold assembly cavity to the reservoir cavity, and the pressurized air force the check valve into an open position, such that the pressurized air and purge vapor flow from the reservoir cavity, through the at least one port, and into the air box.

9. The valve assembly of claim 8, further comprising:
   a cap, the overmold assembly connected to one side of the cap, and the reservoir connected to another side of the cap; and
   a cap aperture formed as part of the cap such that the bypass switching valve selectively blocks the cap aperture;
   wherein the cap aperture provides fluid communication between the reservoir cavity and the overmold assembly cavity when the bypass switching valve is in the open position.

10. The valve assembly of claim 8, further comprising:
    a bleed aperture formed as part of the cap, the bleed aperture adjacent the cap aperture;

wherein the bleed aperture provides fluid communication between the overmold assembly cavity and the reservoir cavity when the bypass switching valve is in the open position or in a closed position, such that pressurized air and purge vapor are able to pass from the overmold assembly cavity to the reservoir cavity under low-pressure conditions.

11. The valve assembly of claim 8, wherein the valve assembly and the air box are part of an air flow system.

12. The valve assembly of claim 11, the air flow system further comprising:
- a carbon canister containing the purge vapor, the carbon canister in fluid communication with the valve assembly; and
- a pressure sensor connected to the carbon canister such that the pressure sensor detects changes in pressure in the carbon canister;
- wherein a diagnostic check is performed when the bypass switching valve is switched between an open position and a closed position, such that the pressure in the canister changes when the bypass switching valve changes between an open position and a closed position, and when a change in pressure in the canister is not detected by the pressure sensor as the bypass switching valve changes between an open position and a closed position, an indication is provided that the air flow system is functioning improperly.

13. A valve assembly mounted on an air box, comprising:
- an overmold assembly having an inlet port;
- a bypass switching valve;
- an overmold assembly cavity formed as part of the overmold assembly, the bypass switching valve located in the overmold assembly adjacent the overmold assembly cavity;
- a cap connected to the overmold assembly;
- a reservoir connected to the cap;
- a reservoir cavity formed as part of the reservoir, the bypass switching valve fluidly connecting the overmold assembly cavity and the reservoir cavity such that the bypass switching valve controls an amount of pressurized air and purge vapor which flows from the overmold assembly cavity to the reservoir cavity;
- a cap aperture formed as part of the cap, the cap aperture providing fluid communication between the overmold assembly cavity and the reservoir cavity when the bypass switching valve is in an open position;
- a bleed aperture formed as part of the cap, the bleed aperture providing fluid communication between the overmold assembly cavity and the reservoir cavity when the bypass switching valve is in the open position or in a closed position, the bleed aperture being smaller in diameter than the cap aperture;
- at least one port connected to the reservoir and in fluid communication with the reservoir cavity;
- an air box, the at least one port extending into an aperture formed as part of the air box; and
- a check valve connected to the reservoir, the check valve biased towards a closed position and fluidly connecting the reservoir cavity and the at least one port, such that the check valve controls the amount of pressurized air and purge vapor between the reservoir cavity and the at least one port;
- wherein pressurized air and purge vapor selectively flow into the inlet port and the overmold assembly cavity such that when the bypass switching valve is in the open position, the pressurized air and purge vapor flow through the cap aperture, through the reservoir cavity, and force the check valve into an open position, such that the pressurized air and purge vapor flow through the at least one port and into the air box.

14. The valve assembly mounted on an air box of claim 13, wherein the valve assembly and the air box are part of an air flow system.

15. The valve assembly mounted on an air box of claim 14, the air flow system further comprising:
- a carbon canister containing the purge vapor, the carbon canister in fluid communication with the valve assembly; and
- a pressure sensor connected to the carbon canister such that the pressure sensor detects changes in pressure in the carbon canister;
- wherein a diagnostic check is performed when the bypass switching valve is switched between an open position and a closed position, such that the pressure in the canister changes when the bypass switching valve changes between an open position and a closed position, and when a change in pressure in the canister is not detected by the pressure sensor as the bypass switching valve changes between an open position and a closed position, an indication is provided that the air flow system is functioning improperly.

16. The valve assembly mounted on an air box of claim 14, wherein the bleed aperture provides fluid communication between the overmold assembly cavity and the reservoir cavity when the bypass switching valve is in the open position or in a closed position such that pressurized air and purge vapor are able to pass from the overmold assembly cavity to the reservoir cavity under low-pressure conditions.

\* \* \* \* \*